United States Patent [19]

Jonas et al.

[11] Patent Number: 5,300,146
[45] Date of Patent: Apr. 5, 1994

[54] THERMOSTABLE IRON OXIDE PIGMENTS, PROCESSES FOR THEIR PRODUCTION, AS WELL AS THEIR USE

[75] Inventors: Friedrich Jonas, Aachen; Andreas Frankenau; Gunter Buxbaum, both of Krefeld, all of Fed. Rep. of Germany

[73] Assignee: Bayer AG, Leverkusen, Fed. Rep. of Germany

[21] Appl. No.: 977,063

[22] Filed: Nov. 16, 1992

[30] Foreign Application Priority Data

Nov. 28, 1991 [DE] Fed. Rep. of Germany ....... 4139052

[51] Int. Cl.$^5$ ................................................. C09C 1/22
[52] U.S. Cl. .................................... 106/456; 106/459; 106/460
[58] Field of Search .................. 106/456, 459, 460

[56] References Cited

U.S. PATENT DOCUMENTS

| | | | |
|---|---|---|---|
| 3,973,982 | 8/1976 | Bingham | 106/433 |
| 4,264,462 | 4/1981 | Buxbaum et al. | 252/62.53 |
| 4,404,254 | 9/1983 | Franz et al. | 106/459 |
| 4,913,063 | 4/1990 | Jonas | 106/413 |
| 4,952,617 | 8/1990 | Ayala et al. | 106/456 |

*Primary Examiner*—Mark L. Bell
*Assistant Examiner*—Willie J. Thompson
*Attorney, Agent, or Firm*—Connolly and Hutz

[57] ABSTRACT

Iron oxide pigments are made stable against oxidation and discoloration by a coating process. Preferred coating compounds are maleic acid hydrazide and phthalic acid.

12 Claims, No Drawings

THERMOSTABLE IRON OXIDE PIGMENTS, PROCESSES FOR THEIR PRODUCTION, AS WELL AS THEIR USE

The present invention relates to iron oxide pigments with an iron(II) content of at least 5 wt % with an additive for increasing the stability towards atmospheric oxidation, processes for the production of these pigments, as well as their use.

Iron oxide pigments that contain iron in the +2 oxidation state are thermodynamically unstable phases in comparison with the iron(III) oxide $Fe_2O_3$. They can be partially or completely oxidized in presence of air or oxygen.

Such reactions are known, for example, with iron oxide black pigments, that correspond in composition and structure to magnetite. As a result of oxidation, the pigment suffers loss of its most important property, namely its colour, and with that becomes useless. The oxidation tendency increases with the fineness of the particles and because of that with the specific surface area of the pigment.

The same is true also of mixtures of iron oxide black with other iron oxide colouring pigments—iron oxide red or iron oxide yellow—that are produced for brown shades.

If the colouring pigments are made useless by the loss of the colour properties, the iron(II)-containing magnetic pigments are made useless by the loss of the magnetic properties, which likewise is caused by oxidation. Most vulnerable of all are finely-divided magnetite pigments as well as mixed phases between magnetite ($Fe_3O_4$) and maghemite ($\gamma$-$Fe_2O_3$) with high iron(II) content. Also sensitive to oxidation, however, are mixed phases of magnetite with maghemite and/or ferrites, such as for example cobalt ferrite and magnetic pigments composed of a core of $Fe_3O_4$ and $\gamma$-$Fe_2O_3$ and a shell of magnetic oxides—particularly of iron and cobalt—surrounding this core. Besides the description "mixed phase", the expression "berthollides" is found in the technical literature for the compositions described here.

The attempt has previously been made to reduce the sensitivity to oxidation of finely-divided ferrimagnetic magnetite pigments by treatment with heterocyclic organic compounds (DE-A 2 744 598). This treatment gave an improvement compared with the untreated pigments that was considerable but could not be raised above a certain level. Moreover, the heterocyclic compounds used are only physically adsorbed on the pigment and therefore largely pass into the water-soluble constituents. From this, incompatibility can result in various binder systems.

It is furthermore known from EP-A-90 241 that boric acid can be used to stabilize iron(II)-containing iron oxides. The pigments stabilized with boric acid show a thermostability comparable with that of pigments coated with heterocyclic compounds, while at the same time the water-soluble constituents are reduced.

Surprisingly, it has now been found that iron(II)-containing iron oxides coated with compounds of general formula (I) have increased thermostabilities compared with the prior art. The compounds used for coating the pigments are of the formula

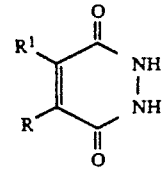

in which
R and $R^1$ are the same or different and represent hydrogen or an alkyl group with 1–2 carbon atoms or halogen or an aryl group with 6–10 carbon atoms or together represent an optionally substituted $C_{3-6}$ alkylene group or ring-forming —CH=CH—CH=CH—.

Compounds of the following formulae are preferred:

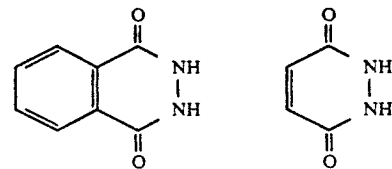

The iron oxide pigments with an iron(II) content that have to be stabilized can firstly be colouring pigments such as iron oxide black and/or iron oxide brown; but secondly they can be magnetic pigments such as magnetite or mixed phases of magnetite with maghemite (berthollide iron oxides) and/or ferrites; or thirdly they can be magnetites or iron oxides with an oxidation state between magnetite and maghemite, coated in each case with metallic oxides.

The production of such pigments is described in the literature and accessible by many processes. Iron oxide black pigments are produced on the commercial scale mainly by two processes (Ullmanns Encyclopädie der technischen Chemie, 4th Edition, Volume 18, page 603, Verlag Chemie GmbH, Weinheim 1979): the precipitation process, in which the iron(II) salt solutions are precipitated with alkalis while air is passed in at ca. 90° C. in the neighbourhood of the neutral point, until a Fe(III)/Fe(II) ratio of about 2 is reached; and the Laux process, in which nitrobenzene is reduced with metallic iron to aniline, and that can be so controlled that intensely coloured iron oxide black pigments are formed.

Depending on the production process and purity of the raw materials used, iron oxide black pigments can contain varying amounts, usually up to 5 wt %, of secondary ingredients such as e.g. $SiO_2$ or $Al_2O_3$.

The Fe(III)/Fe(II) ratio in the sales products also normally exceeds 2, in deviation from the theoretical value, and as a rule is between 2.3 and 3.0. By far the greatest part of iron(II)-containing iron oxide brown pigments are produced by mixing iron oxide yellow and/or iron oxide red with iron oxide black (Ullmanns Encyclopädie der technischen Chemie, as above). The production of iron(II)-containing iron oxide magnetic pigments (Ullmanns Encyclopädie der technischen Chemie, 4th Edition, Volume 18, page 643, Verlag Chemie GmbH, Weinheim 1979) usually starts from α-FeOOH or γ-FeOOH, which is dried, dehydrated and reduced with hydrogen at 350°–600° C. to $Fe_3O_4$. Mixed phases of magnetite and maghemite (berthollides) can be obtained by partial oxidation of the magnetite pigments under mild conditions. Mixed-phase pigments (berthollides) of magnetite with maghemite and/or ferrites are usually produced by co-precipitating ferrite-forming metals, such as e.g. Zn, Mn, Co, Ni, Ca, Mg, Ba, Cu or Cd, as oxides or hydroxides during the production of the FeOOH initial product or by applying these metals to finished FeOOH pigments and converting the latter. Also those special magnetic pigments that are produced by application of a coating of magnetic metal oxides, especially of iron and of cobalt, to a core of $Fe_3O_4$ or of an iron oxide with an oxidation state between $Fe_3O_4$ and $\gamma$-$Fe_2O_3$ (e.g. epitaxial coating DE-B 22 35 383, DE-A 28 17 410) can be protected. The known measures against sintering customary during the production of magnetic pigments as well as after-treatments and dosing do not interfere with the application of the process according to the invention.

The present invention furthermore relates to processes for the production of the iron oxide pigments according to the invention. Thus iron(II)-containing iron oxide pigments produced in a way known per se can be mixed with at least one compound of formula (I) and the mixture obtained optionally ground and optionally finally annealed. It is also possible for iron(II)-containing iron oxide pigments produced in a way known per se to be treated in suspension with at least one compound of formula (I), dried, optionally ground, and optionally finally annealed.

The amount of the compound of formula (I) added depends on the given kind of iron oxide pigment.

For the customary iron oxide black pigments with iron(II) contents between 20 and 28 wt %, calculated as FeO, and specific surface areas between 12 and 18 $m^2/g$, measured with the aid of the nitrogen 1-point adsorption method according to BET, it is usually sufficient to add so much compound (I) that the content of (I) in the treated pigment is 0.2 to 5 wt %, preferably 0.3 to 2 wt %. The pigments used for magnetic signal storage are more finely divided than the iron oxide black pigments (BET surface areas—determined by the $N_2$ 1-point method—exceeding 18 $m^2/g$) and, in accordance with their specific surface area, which can easily exceed 40 $m^2/g$, require larger amounts of additive for equally high iron(II) contents.

If the iron(II) content is lower, which can be the case for example in the above-described iron oxide magnetic pigments coated with magnetic metal oxides, the amount of additive can be reduced accordingly. Apart from that, the amount of treatment necessary to achieve the desired thermostability in any individual case can be determined without difficulty by the expert with the aid of simple experimental tests.

According to the process of the invention, the iron(II)-containing iron oxide pigments produced in a way known per se are mixed with one or several compounds (I). The compounds (I) are suitably brought into a finely-divided state beforehand. However, they can also be admixed in the form of a solution or suspension in aqueous and/or organic medium. Standard technical devices can be used for mixing, such as e.g. pneumatic mixers, blade mixers, screw mixers, drum mixers or cone mixers. The mixing can take place at room temperature or at temperatures above room temperature. The operation will generally be carried out in the presence of air, but the use of inert gases, such as e.g. nitrogen, is advisable, especially if elevated temperatures are applied. If only small amounts of compounds (I) are mixed with large amounts of pigment, premixing can be advantageous. The mixture obtained is optionally then ground. For this purpose, milling units of very diverse construction are suitable, e.g. roller mills, edge mills, pendulum roller mills, hammer mills, pin mills, turbine mills, ball mills or jet mills. The grinding can take place at room temperature or at temperatures above room temperature, optionally under inert gases, such as e.g. nitrogen. Optionally the product is finally annealed at temperatures up to 500° C. in an inert atmosphere or in an atmosphere containing only small amounts of oxygen.

According to the other process of the invention, the iron(II)-containing iron oxide pigments produced in a way known per se are first treated in suspension with one or several compounds (I). Water will generally be used as the suspension medium, but the use of aqueous/organic or pure organic media is also possible in principle. The compounds (I) can be added at any time before, during or after production of the pigment suspension. The treatment can be carried out at room temperature or elevated temperature, optionally under inert atmosphere. The treatment duration is preferably 1 minute to several hours. The treated pigment is dried in the second process stage. It has proved useful to carry out the drying in such a way that the total amount of liquid in the suspension is evaporated. The spray drying technique has proved particularly successful in this connection. The treated dried pigment is optionally ground as in the first process and optionally finally annealed at temperatures up to 500° C. in an inert atmosphere or an atmosphere containing only small amounts of oxygen.

For reasons of cost, thermally stable iron(II)-containing iron oxide pigments that are mixtures of various iron oxide colouring pigments are suitably so produced that only those mixture components that contain divalent iron are protected from oxidation by one of the two processes according to the invention and only then is mixing with the other iron oxide pigments carried out. But it is obviously also possible to subject the mixture of iron(II)-containing iron oxide colouring pigments and iron(II)-free iron oxide colouring pigments as a whole to one of the two processes according to the invention.

The thermally stable iron oxide colouring pigments or pigment mixtures according to the invention have their fields of application where inorganic and/or organic materials have to be coloured. This invention relates to their use for colouring in the production of plastics parts, of lacquers and of emulsion paints, or for colouring inorganic building materials, such as e.g. plasters, concrete roofing tiles or sand-lime bricks. The thermally stable iron oxide magnetic pigments according to the invention can equally advantageously be used for the manufacture of any kind of magnetic recording medium, such as e.g. audio and video tapes, instrumentation tapes, computer tapes, magnetic cards, flexible magnetic disks, rigid magnetic disks and drum stores.

The invention is explained in more detail below by means of examples, which, however, in no way restrict the object of the application.

EXAMPLES

Production of the after-treated pigment samples

For the after-treatment, 50 g pigment[1] in each case are homogenized in a mixer (Starmix) for 30 sec with the after-treatment substance (see Table 1). While the mixer is running, the substance is added either as powder or as a solution in water or in propylene glycol.
[1] Magnetite pigment with a BET specific surface area of 17.9 $m^2/g$ and an iron(II) content of 24.2 %, calculated as FeO.

After that, all samples are adjusted to the same residual moisture content by storing them for 20 h at 40° C. in the circulating air oven.

Subsequently all samples are ground for 3 minutes with a vibratory disc mill (agate insert).

Testing of the stabilizing action

All after-treated samples are annealed for 1 h at 200° C. on small aluminium dishes in the drying oven. An untreated sample and samples after-treated with aminotriazole and boric acid are annealed together for purposes of comparison.

The increase of the yellow cast, as the residual colour difference after tinting strength matching, is used for evaluation of the stability. For this purpose, 0.2 g of the after-treated black pigment is dispersed in 5 g white paste (consisting of 3 g Alkydal® L64—commercial product of Bayer AG—and 2 g rutile) on an automatic plate miller ($\phi$ 25 mm). The colouristics of this sample are determined with a spectral colorimeter (Data Flash 2000, geometry d/8).

The after-treatment agents, the type of application and the results of the annealing tests are assembled in Table 1.

TABLE 1

| After-treatment agent | Amount wt % | Application | Yellow discolouration after 1 h 200° C. $\Delta b^*$ |
|---|---|---|---|
| — | — | — | 3.9 |
| 3-amino-1,2,4-triazole | 1.0 | dry, | 2.1 |
|  |  | 5% in water | 2.1 |
| Boric acid | 1.0 | dry, | 2.2 |
|  |  | 5% in propylene glycol | 2.4 |
| Phthalic acid hydrazide | 1.0 | dry | 1.8 |
| Maleic acid hydrazide | 1.0 | dry | 1.7 |

It is clear from the table that the samples stabilized according to the invention lead to a reduced yellow colouration compared with the prior art and, because of that, that the pigments have a higher temperature-stability.

What is claimed is:

1. Iron oxide pigments with an iron(II) content of at least 5%, calculated as FeO, containing an additive for raising the stability towards air oxidation consisting of at least one compound of the formula (I)

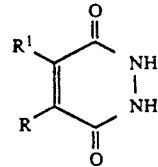

in which

R and $R^1$, which are the same or different, represent hydrogen or an alkyl group with 1-2 carbon atoms or halogen or an aryl group with 6-10 carbon atoms or together represent an optionally substituted $C_{3-6}$ alkylene group or ring-forming —CH=CH—CH=CH—.

2. Iron oxide pigments according to claim 1, containing 0.2 to 5 wt % of said additive relative to the pigment.

3. Iron oxide pigments according to claim 2, containing 0.3 to 2 wt % of said additive.

4. Iron oxide pigments according to claim 1, wherein the iron oxide pigments are iron oxide black pigments, iron oxide brown pigments, or mixtures thereof.

5. Iron oxide pigments according to claim 1, wherein the iron oxide pigments are magnetite or mixed phases of magnetite with maghemite or ferrites.

6. Iron oxide pigments according to claim 1, wherein the iron oxide pigments are magnetic metal oxide-coated magnetites or iron oxides with an oxidation state between magnetite and maghemite.

7. A process for production of iron oxide pigments according to claim 1, comprising mixing iron oxide pigments with at least one compound of the formula (I).

8. The process of claim 7, further comprising grinding and annealing the pigments.

9. A process for the production of iron oxide pigments according to claim 1, comprising treating iron oxide pigments in suspension with at least one compound (I), followed by drying the pigments.

10. The process of claim 9, further comprising grinding and annealing the pigments.

11. A process according to claim 7, wherein phthalic acid hydrazide or maleic acid hydrazide is used as compound of formula (I).

12. A process according to claim 9, wherein phthalic acid hydrazide or maleic acid hydrazide is used as compound of formula (I).

* * * * *

UNITED STATES PATENT AND TRADEMARK OFFICE
CERTIFICATE OF CORRECTION

PATENT NO. : 5,300,146
DATED : April 5, 1994
INVENTOR(S) : Jonas et al

It is certified that error appears in the above-indentified patent and that said Letters Patent is hereby corrected as shown below:

On the Title Page, item [56] should read:

References Cited

U.S. PATENT DOCUMENTS

| | | | |
|---|---|---|---|
| 3,973,982 | 8/1976 | Bingham | 106/433 |
| 4,264,462 | 4/1981 | Buxbaum et al | 252/62.53 |
| 4,404,254 | 9/1983 | Franz et al | 106/459 |
| 4,913,063 | 4/1990 | Jonas | 106/413 |
| 4,952,617 | 8/1990 | Ayala et al | 106/456 |
| 4,122,216 | 10/1978 | Akira Okazoe | 427/128 |
| 4,491,619 | 1/1985 | Biermann et al | 428/403 |
| 4,741,921 | 5/1988 | Kitaoka et al | 427/127 |
| 4,857,417 | 8/1989 | Kitaoka et al | 428/694 |

UNITED STATES PATENT AND TRADEMARK OFFICE
CERTIFICATE OF CORRECTION

PATENT NO. : 5,300,146
DATED : April 5, 1994
INVENTOR(S) : Jonas et al

It is certified that error appears in the above-indentified patent and that said Letters Patent is hereby corrected as shown below:

FOREIGN PATENT DOCUMENTS

| | | |
|---|---|---|
| 2744598 | 4/1979 | Germany |
| 0090241 | 10/1983 | Europe |
| 0302342 | 2/1989 | Europe |
| 2281410 | 3/1976 | France |

Signed and Sealed this

Twenty-third Day of August, 1994

Attest:

BRUCE LEHMAN

*Attesting Officer*         *Commissioner of Patents and Trademarks*